United States Patent
Lee et al.

(10) Patent No.: US 12,152,872 B2
(45) Date of Patent: *Nov. 26, 2024

(54) METHOD FOR ASSESSING TOOL PROFILE USING BREAK-BEAM TOOL SETTING APPARATUS

(71) Applicant: RENISHAW PLC, Wotton-under-Edge (GB)

(72) Inventors: William Ernest Lee, Hillesley (GB); Paul Maxted, Bradley Stoke (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,505

(22) Filed: Jun. 9, 2022

(65) Prior Publication Data

US 2022/0316859 A1 Oct. 6, 2022

Related U.S. Application Data

(63) Continuation of application No. 16/635,135, filed as application No. PCT/GB2018/052472 on Aug. 31, 2018, now Pat. No. 11,371,830.

(30) Foreign Application Priority Data

Sep. 5, 2017 (EP) .................................... 17189504

(51) Int. Cl.
*G01B 11/02* (2006.01)
*B23Q 17/24* (2006.01)
(Continued)

(52) U.S. Cl.
CPC ........ *G01B 11/028* (2013.01); *B23Q 17/2485* (2013.01); *G01B 11/04* (2013.01); *G01B 11/24* (2013.01)

(58) Field of Classification Search
CPC ....... G01B 11/028; G01B 11/04; G01B 11/24; B23Q 17/2485; B23Q 17/24
See application file for complete search history.

(56) References Cited

U.S. PATENT DOCUMENTS

| 4,403,860 A | 9/1983 | Pryor |
| 4,982,103 A | 1/1991 | Meiffren et al. |

(Continued)

FOREIGN PATENT DOCUMENTS

| DE | 2747487 A1 | 4/1979 |
| DE | 3105568 A1 | 2/1982 |

(Continued)

OTHER PUBLICATIONS

Mar. 1, 2018 Extended Search Report issued in European Patent Application No. 17189504.8.

(Continued)

*Primary Examiner* — Michael P LaPage
(74) *Attorney, Agent, or Firm* — Oliff PLC

(57) ABSTRACT

A method for assessing the profile of a tool using a non-contact tool setting apparatus that includes a transmitter for emitting a light beam and a receiver for receiving the beam. The receiver generates a beam intensity signal describing the intensity of received light. The setting apparatus is mounted to a coordinate positioning apparatus that allows the tool to be moved relative to the setting apparatus. The method includes using the coordinate positioning apparatus to move the tool relative to the setting apparatus along a tool inspection path, the tool inspection path being selected so that the light beam is traced substantially along a periphery of the tool to be inspected. Beam intensity data is collected describing the beam intensity signal that is generated by the (Continued)

receiver as the tool inspection path is traversed and analysis of the collected beam intensity data is used to assess the tool profile.

7 Claims, 6 Drawing Sheets

(51) Int. Cl.
*G01B 11/04* (2006.01)
*G01B 11/24* (2006.01)

(56) References Cited

U.S. PATENT DOCUMENTS

| | | | |
|---|---|---|---|
| 4,988,200 A | 1/1991 | Cohen-Sabban | |
| 5,004,930 A | 4/1991 | Gremaud et al. | |
| 5,212,391 A | 5/1993 | Wachli | |
| 5,255,199 A | 10/1993 | Barkman et al. | |
| 5,353,551 A | 10/1994 | Nishida | |
| 5,404,021 A | 4/1995 | Mangano et al. | |
| 5,871,391 A * | 2/1999 | Pryor | F02F 1/24 356/600 |
| 5,940,787 A | 8/1999 | Gelston | |
| 6,161,055 A | 12/2000 | Pryor | |
| 6,496,273 B1 | 12/2002 | Stimpson et al. | |
| 6,635,894 B1 | 10/2003 | Stimpson et al. | |
| 7,315,018 B2 | 1/2008 | Ashton et al. | |
| 7,499,152 B2 | 3/2009 | Roders et al. | |
| 10,775,765 B2 | 9/2020 | Moersch et al. | |
| 2002/0118372 A1 | 8/2002 | Bucher et al. | |
| 2006/0020422 A1 | 1/2006 | Ashton et al. | |
| 2009/0051933 A1 | 2/2009 | Stimpson et al. | |
| 2010/0014099 A1 | 1/2010 | Christoph et al. | |
| 2010/0027031 A1 | 2/2010 | Stimpson et al. | |
| 2010/0280649 A1 * | 11/2010 | Chen | B23Q 17/0947 700/175 |
| 2011/0317909 A1 | 12/2011 | Jeyaraman et al. | |
| 2012/0085893 A1 | 4/2012 | Miyamoto et al. | |
| 2013/0162806 A1 * | 6/2013 | Ding | G01B 11/028 382/152 |
| 2013/0176429 A1 * | 7/2013 | Kurahashi | B23Q 17/249 348/142 |
| 2013/0208286 A1 * | 8/2013 | Kurahashi | B23Q 17/249 356/601 |
| 2014/0148939 A1 * | 5/2014 | Nakano | G01B 11/2513 700/166 |
| 2014/0238119 A1 * | 8/2014 | Du | B23Q 17/0938 73/104 |
| 2015/0009321 A1 | 1/2015 | Goldstein et al. | |
| 2016/0273905 A1 * | 9/2016 | Nakano | B23Q 17/2466 |
| 2016/0318145 A1 * | 11/2016 | Kawanishi | G01B 11/08 |
| 2018/0297166 A1 | 10/2018 | Yauchi et al. | |
| 2020/0189120 A1 * | 6/2020 | Weaver | G05B 19/4189 |
| 2020/0282504 A1 * | 9/2020 | Ziegltrum | B23Q 17/249 |

FOREIGN PATENT DOCUMENTS

| | | | |
|---|---|---|---|
| DE | 3816933 A1 | 12/1988 | |
| DE | 3905949 A1 | 8/1990 | |
| DE | 3925588 A1 | 2/1991 | |
| DE | 4232236 A1 | 4/1993 | |
| DE | 19528376 A1 | 2/1997 | |
| DE | 102004021254 A1 | 11/2005 | |
| DE | 102005043659 A1 * | 3/2007 | ......... B23Q 17/2466 |
| DE | 102013011307 A1 | 1/2015 | |
| DE | 102017005488 A1 | 12/2018 | |
| EP | 0320326 A1 | 6/1989 | |
| EP | 0403908 A2 | 12/1990 | |
| EP | 0532933 A1 | 3/1993 | |
| EP | 1 587 648 B1 | 11/2013 | |
| JP | H10-202477 A | 8/1998 | |
| JP | 2006-510495 A | 3/2006 | |
| JP | 2013-124889 A | 6/2013 | |
| JP | 2019-977 A | 1/2019 | |
| WO | 2017002186 A1 | 1/2017 | |

OTHER PUBLICATIONS

Oct. 9, 2018 International Search Report issued in International Patent Application No. PCT/GB2018/052472.

Oct. 9, 2018 Written Opinion of the International Searching Authority issued in International Patent Application No. PCT/GB2018/052472.

Jun. 15, 2021 Office Action Issued in U.S. Appl. No. 16/635,135.

Oct. 29, 2021 Office Action Issued in U.S. Appl. No. 16/635,135.

Mar. 1, 2022 Notice of Allowance Issued in U.S. Appl. No. 16/635,135.

Reiser, W. "Laser system for non-contact tool setting and breakage detection". Transactions on Engineering Sciences, vol. 16., pp. 33-42, 1997.

Weis, Wolfgang, "Tool Wear Measurement on Basis of Optical Sensors, Vision Systems and Neuronal Networks" (Application Milling). Proceedings of WESCON, pp. 134-138, 1993.

Zhang, Chen and Zhang, Jilin. "On-line tool wear measurement for ball-end milling cutter based on machine vision". Computers in Industry, vol. 64, pp. 708-719, 2013.

Y.S. Wong, A.Y.C. Nee, X.Q. Li, and C. Reisdorf. "Tool Condition Monitoring using Laser Scatter Pattern" Journal of Materials Processing Technology, vol. 63, pp. 205-210, 1997.

Rehorn, Adam G., Jiang, Jin, and Orban, Peter E. "State-of-the-art methods and results in tool condition monitoring: a review" The International Journal of Advanced Manufacturing Technology, vol. 26, pp. 693-710, 2005.

O. Ryabov and K. Mori. "Laser sensor for Imaging and Detection of Cutting Tool Wear" Sensors for Industry Conference, Houston, Texas, USA, pp. 19-21, Nov. 2002.

Litwiller, Dave. "CCD vs CMOS: Facts and Fiction" Photonics Spectra, Laurin Publishing Co. Inc, Jan. 2001.

Oct. 13, 2020 Renishaw Response to R.161/162 EP Communication from Apr. 16, 2020.

Keferstein, Claus P., et al "Fertigungsmesstechnik Praxisorientierte Grundlagen, Moderne Messverfahren" Springer Vieweg, edition 8. 2015, p. 67-76.

Oct. 8, 2024 Notice issued in European Patent Application No. 18762125.5.

* cited by examiner

METHOD FOR ASSESSING TOOL PROFILE USING BREAK-BEAM TOOL SETTING APPARATUS

This application is a Continuation Application of U.S. patent application Ser. No. 16/635,135, filed Jan. 29, 2020, which is a National Stage Entry of PCT/GB2018/052472, filed Aug. 31, 2018, which claims priority to European Patent Application No. EP 17189504.8, filed Sep. 5, 2017. The entire contents of those prior applications are incorporated by reference herein in their entireties.

The present invention relates to non-contact tool setting apparatus for coordinate positioning apparatus and particularly to an improved method and apparatus for measuring the profile of a tool.

Break-beam tool setting devices for use on machine tools are known, for example see U.S. Pat. No. 6,496,273. Tool setting apparatus of this type includes a light source which generates a beam of light which is passed to a light detector. During a tool setting operation, the machine tool is operated to move a tool into and out of the light beam. Interruption of the light beam by the tool is detected by analysis of the detector output signal and the apparatus generates a so-called "trigger signal" to indicate to the associated machine tool that the light beam has been broken. Typically, this trigger signal is issued when the light level reaches 50% of the "beam clear" state (i.e. when 50% of the optical beam is blocked from reaching the detector). The machine tool records the position of the tool relative to the tool setting device on receipt of the "trigger signal" thereby allowing a single position on the tool edge to be determined. This measurement move may be repeated multiple times to measure, one by one, multiple different positions on the tool edge. This arrangement thus allows tool size, such as the tool length and/or tool diameter, to be measured.

EP1587648 describes an alternative way of generating a "trigger signal" during a measurement move in which a rotating or non-rotating tool is moved into or out of a light beam. In particular, EP1587648 describes digitising a detector output signal and identifying minima and/or maxima in the digitised data that correspond to one or more teeth of the cutting tool entering and/or exiting the beam during the measurement move. A digital processor determines, in real-time, whether the minima/maxima conform to a curve of expected type and issues a trigger signal only when such a fitted curve crosses a threshold. In this manner, it is possible to measure the position of a single point on the tool during a measurement move into, or out of them the light beam. For a stationary tool, the measured position is on the edge that blocks the light beam. For a rotating tool having multiple cutting teeth that are rotated into and out of the beam, the measured position is on the cutting edge having the largest diameter.

The above described tool setting devices thus allow the position of a point on the edge of a tool to be established relatively quickly thus providing a measure of tool length or tool diameter. It is also possible to measure the profile of a tool by repeating the measurement move so as to measure multiple different points along the edge of the tool, but such a process can be very time consuming (i.e. the tool has to be moved into and out of the beam multiple times) and is typically considered impractical. More details of such a prior art tool measurement process are described below with reference to FIG. 9a.

According to a first aspect of the present invention, there is provided a method for assessing the profile of a tool using a non-contact tool setting apparatus comprising a transmitter for emitting a light beam and a receiver for receiving the light beam, the receiver generating a beam intensity signal describing the intensity of received light, the non-contact tool setting apparatus being mounted to a coordinate positioning apparatus that allows the tool to be moved relative to the non-contact tool setting apparatus, the method comprising the steps of;

(i) using the coordinate positioning apparatus to move the tool relative to the non-contact tool setting apparatus along a tool inspection path, the tool inspection path being selected so that the light beam is traced substantially along a periphery of the tool to be inspected, (ii) collecting beam intensity data describing the beam intensity signal that is generated by the receiver as the tool inspection path of step (i) is traversed, and (iii) analysing the beam intensity data collected in step (ii) to assess the tool profile.

The first aspect of the present invention thus relates to a method for assessing the profile of a tool using a non-contact tool setting apparatus. The profile that is assessed may be the shape, position or dimension(s) of one or more cutting features of the tool. The non-contact tool setting apparatus comprises a break-beam type tool detection system in which a light beam (e.g. a laser beam) emitted from the transmitter (e.g. by a laser diode of the transmitter) is passed through a region of free space to the receiver. The receiver detects (e.g. using a photodiode) the received light and generates a beam intensity signal describing the intensity of the received light. The non-contact tool setting apparatus is mounted to a coordinate positioning apparatus, such as a machine tool, that can be programmed to move the tool relative to the non-contact tool setting apparatus. The relative motion may be imparted by moving the tool and/or the non-contact tool setting apparatus.

The method of the present invention comprises a step (i) of using the coordinate positioning apparatus to impart relative motion between the light beam and the tool to define a tool inspection path. In particular, step (i) comprises moving the tool relative to the non-contact tool setting apparatus so that the light beam is traced along a periphery of the tool. The coordinate positioning apparatus is thus arranged to move the light beam along a tool inspection path that causes the light beam to be scanned along a periphery of the tool. In other words, the tool inspection path is selected so that the light beam is moved in a direction that is approximately tangential to the periphery of the tool. This should be contrasted to the prior art techniques described above in which the tool is moved into or out of the light beam (i.e. in a direction substantially perpendicular to the edge of the tool) to acquire a measurement point.

For a non-rotating (stationary) tool the periphery of the tool is simply the edge of the tool that is to be inspected. If the tool is rotating, the tool inspection path is set to trace the light beam along the outermost extent of the multiple edges of the rotating tool. The motion that traces the light beam along the periphery of the tool is thus performed in addition to any rotary tool motion (e.g. rotation of the tool about its longitudinal axis) that also causes different parts of the tool circumference to be rotated into and out of the light beam. The motion that traces the light beam along the periphery of the tool is preferably only linear (translational) motion and does not include any rotational motion. In other words, the tool inspection path preferably defines only linear motion (e.g. motion along mutually orthogonal x, y and/or z axes) of the tool relative to the light beam. The tool inspection path may, depending on the shape of the tool, be a straight line and/or it may include one or more curved sections to follow the periphery of a curved tool. The tool inspection path may pass along only parts of the tool that are to be measured or it may pass around the whole periphery of the tool. Preferably, at least some of the light beam falls on the tool for the duration of the traverse of the tool inspection path. As explained below, the tool inspection path may include a single pass around the tool periphery, or it may include multiple passes around the tool periphery.

Step (ii) comprises sampling the beam intensity signal that is generated as the tool inspection path is traversed and thereby generating beam intensity data. For example, the beam intensity signal may be digitised by an analogue-to-digital converter to generate the set of beam intensity data. In other words, the beam intensity signal that describes the level of beam obscuration will typically vary as the tool inspection path is traversed. Step (ii) comprises periodically sampling the beam intensity signal to generate the beam intensity data that are to be analysed. Any suitable sampling rate may be used. For example, a higher sampling rate may be used for rotating tools (e.g. to obtain beam intensity data describing beam obscuration as the tool is rotated). The sampling rate may be varied as the light beam traverses the tool inspection path to allow more beam intensity data to be collected for certain regions of the tool. It should also be noted that the light beam may traverse the tool inspection path at a single, constant, speed or it may be moved at different speeds when passing along different parts of the tool inspection path. There may also be one or more dwell periods defined as part of the tool inspection path in which the light beam is not moved relative to the tool (although the tool itself may still be rotating during any such dwell period). Beam intensity data collected during such a dwell period is particularly useful when measuring rotating tools (e.g. to allow position at multiple points around the tool circumference, such as the edges of different cutting teeth, to be measured). It is also possible to obtain more accurate information from the coordinate positioning apparatus about tool position relative to the non-contact tool setter during such a dwell period.

As described below, the collected beam intensity data includes information on the profile of the tool. Step (iii) thus comprises analysing the beam intensity data, using any one of the techniques described below. The analysis may comprise analysing all of the collected beam intensity data or it may comprise selecting a subset of the data (e.g. from a region or regions of interest along the tool inspection path). In this manner, the tool profile can be assessed.

The present invention thus provides a quick and simple technique for measuring the profile of a tool. Instead of individually measuring multiple points around a tool by repeatedly driving the tool into and out of the light beam as per the touch trigger type measurements described above, the periphery of the tool can be measured in detail via a scanning type operation that traces the light beam around the tool periphery. This makes the tool profiling process quicker and easier.

Advantageously, the tool inspection path is selected so that the light beam traces a path along the nominal position of the tool periphery. In other words, the tool inspection path may be generated using knowledge of the nominal or expected tool profile. For example, the tool inspection path may be generated from tool design (e.g. CAD) data of the tool. The tool inspection path may be selected so that, for a tool that conforms to its nominal specification, the light beam is obscured by a certain pre-set level (e.g. 50%) as it traverses the tool inspection path. Any deviation in beam intensity data from the pre-set level thus indicates the tool profile deviates from nominal. Step (iii) may thus comprise assessing whether the collected beam intensity data corresponds to that expected if the profile of the tool being inspected conformed to its nominal profile. Any deviation greater than a certain amount may be used to indicate required tool tolerances are not met. Alternatively, the deviation could be used to adjust the assumed dimensions of the tool.

As explained above, any deviation in beam intensity data from a pre-set level (e.g. from the 50% level) can be used to indicate the tool profile deviates from nominal. A calibration process could also be performed prior to measurement to ascertain the change in the beam intensity signal that will occur when there is a certain shift in the location of the tool edge within the light beam. For example, a calibration table or function could be generated that describes the relationship between the tool edge position within the beam and the beam intensity signal. It should be noted that the relationship between the tool edge position and the beam intensity signal may be non-linear, especially for larger changes in position within the beam. Such a calibration process could, for example, involve moving a tool edge away from the position that results in 50% beam occlusion in small steps (e.g. 10 µm step) and recording the resulting beam intensity signal at each position. This type of calibration would allow any changes in the beam intensity signal (e.g. a shift from 50% to 60% or from 50% to 40%) to be converted into a deviation or shift in tool edge position. In this manner, the assumed dimensions of the tool could be adjusted based on the acquired measurements.

Advantageously, step (iii) comprises comparing the beam intensity data collected in step (ii) with previously acquired beam intensity data. The comparison may be a direct comparison of individual beam intensity data values. Alternatively, an indirect comparison may be performed (e.g. of the minima intensity values for rotating tools that are described below). Conveniently, the previously acquired beam intensity data comprises data collected from a previous measurement of the same tool. For example, the previously acquired beam intensity data may be collected prior to the tool being used for cutting purposes. Alternatively, the previously acquired beam intensity data may comprise data collected from a measurement of a reference tool having the same nominal profile as the tool. In other words, a "golden" or reference tool that is nominally identical to the tool being measured may provide the reference or baseline measurements with which the beam intensity data collected in step (ii) are compared. Step (iii) may thus conveniently provide an indication of whether the tool profile has changed relative to the previous measurement. This may include indicating if any critical sections of the tool profile have changed by more than an amount that might result in the cutting performance being compromised. The indication may thus comprise raising an error flag when certain tool profile changes have occurred.

The method may be performed using a tool that is not being rotated (i.e. the only motion during measurement may be the motion of the tool relative to the light beam along the tool inspection path). Alternatively, the tool may be rotated during measurement. The tool may thus be held in a rotatable spindle of the coordinate positioning apparatus. The tool may comprise one or more cutting teeth located around its radius. Conveniently, the tool is rotated about its longitudinal axis whilst it is moved along the tool inspection path. In this manner, the different cutting teeth move into and out of the light beam in turn during rotation of the tool producing minima and/or maxima in the beam intensity data. Step (iii) may thus conveniently comprise identifying minima and/or maxima in the beam intensity data. The identification of such minima and/or maxima may be performed by a digital signal processing method of the type described in EP1587648.

Advantageously, the tool comprises a plurality of cutting teeth. Conveniently, step (iii) comprises identifying the minima and/or maxima associated with each tooth of the tool. In this manner, it is possible to separately assess the profile of each tooth. For example, the variation in the minima and/or maxima associated with a tooth that occurs as the tool inspection path is traversed may be used to assess the profile of that tooth. This allows separate profiling of different teeth of a rotating tool to be performed with a single traverse of the tool inspection path. For example, size deviations of individual teeth could be determined using previously acquired calibration data as described above or any such deviations could be compared to previous measurements. In addition to identifying minima and/or maxima, the shape of the minima and/or maxima may be used to infer certain tool profile information. Step (iii) may thus comprise analysing the shape of the minima and/or maxima to assess the profile of the tooth producing the minima and/or maxima.

Advantageously, step (ii) comprises digitising the beam intensity signal to generate the beam intensity data. This may be performed using an analogue to digital converter (ADC) to sample the beam intensity signal. A sampling rate of at least 10 kHz is preferably used (e.g. for a tool rotating at 3000 rpm). Conveniently, a sampling rate of at least 100 kHz is used. A sampling frequency of between 100 KHz and 500 kHz may usefully be employed. Step (iii) advantageously comprises using a digital signal processor (DSP) to analyse the beam intensity data. This may be done after all the data has been collected, or the analysis may be started when the data is still being collected. As mentioned above, a constant sampling rate may be used. Alternatively, the sampling rate may be varied as the tool inspection path is traversed.

The tool inspection path may be pre-calculated prior to the coordinate positioning apparatus moving the tool. In other words, the tool inspection path may comprise a pre-programmed path that the coordinate positioning apparatus is programmed to follow prior to starting step (i). Instead of such a known-path technique, the tool inspection path could be generated during step (i) using feedback passed from the non-contact tool setting apparatus to the coordinate positioning apparatus. For example, the tool inspection path could be selected to maintain the beam intensity signal within a certain range.

Any suitable coordinate positioning apparatus may be used to implement the present method. Advantageously, the coordinate positioning apparatus is a machine tool (e.g. a computer numerically controlled or CNC machine tool). Alternatively, the coordinate positioning apparatus may be a coordinate measuring machine (CMM), a flexible gauge (such as the Equator system sold by Renishaw plc, Wotton-Under-Edge, UK) or an offline tool inspection apparatus etc.

The non-contact tool setting apparatus used in the method may comprise discrete transmitter and receiver units that can each be attached to a bracket. Alternatively, a single unit may be provided that comprises the transmitter and receiver. The apparatus may include an interface separate to the transmitter/receiver unit(s) or the interface may be formed integrally with such units. A processor may be provided to perform step (iii) of the method. An ADC may be provided to perform step (ii). The processor and/or ADC may be located in the interface, in a separate processing unit or be provided as part of the coordinate positioning apparatus.

Advantageously, the transmitter comprises a laser for generating light. The transmitter may also comprise optics for providing a collimated light beam. Alternatively, the transmitter may provide a focused (rather than collimated) laser beam. The light beam may have a substantially elliptical or circular profile (e.g. a Gaussian beam profile). The light beam may have a diameter of less than 0.5 mm, less than 1 mm, less than 2 mm or less than 3 mm.

A second aspect of the present invention comprises apparatus for performing non-contact tool profile measurement on a coordinate positioning apparatus, the apparatus comprising; a transmitter for emitting a light beam, a receiver for receiving the light beam and generating a beam intensity signal describing the intensity of light received at the receiver, an analogue-to-digital converter for producing beam intensity data from the beam intensity signal, and a processor for analysing the beam intensity data, characterised in that the processor is configured to assess the profile of a tool by analysing the beam intensity data produced when the tool is moved along a tool inspection path, the tool inspection path being selected to trace the light beam around the periphery of the tool. The apparatus may include any one or more features described above in the context of the analogous method.

According to a third aspect of the invention, there is provided a method of measuring a tool using a non-contact tool setting apparatus comprising a transmitter for emitting a light beam and a receiver for receiving the light beam, the receiver generating a beam intensity signal describing the intensity of received light, the non-contact tool setting apparatus being mounted to a coordinate positioning apparatus that allows the tool to be moved relative to the non-contact tool setting apparatus, the method comprising the steps of; (i) using the coordinate positioning apparatus to move the tool through the light beam, and (ii) collecting beam intensity data describing the beam intensity signal that is generated by the receiver during step (i), characterised by a step (iii) of comparing the beam intensity data collected in step (ii) to previously acquired beam intensity data, the comparison providing an indication of whether the profile of the tool has changed. Step (i) may comprise moving the tool along a tool inspection path and the previously acquired beam intensity data may have been created by moving the tool along the same inspection path.

The invention will now be described, by way of example only, with reference to the accompanying drawings, in which.

Figure 2:
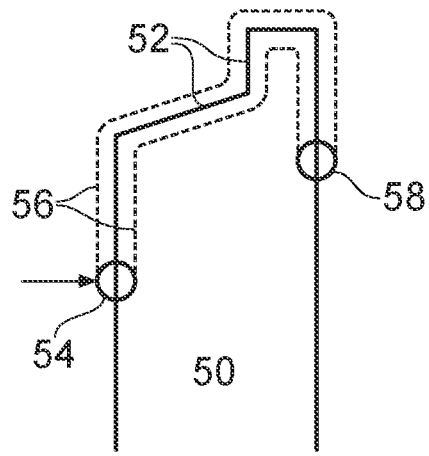
FIG. 2 shows a cutting tool with a light beam moved along its periphery.
Figure 3:
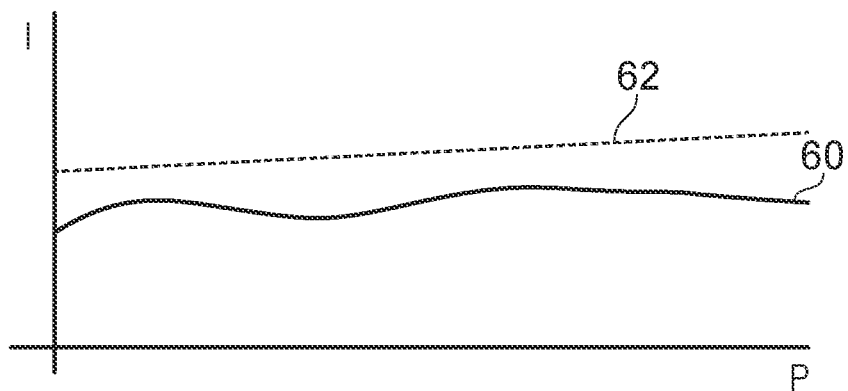
Figure 4:
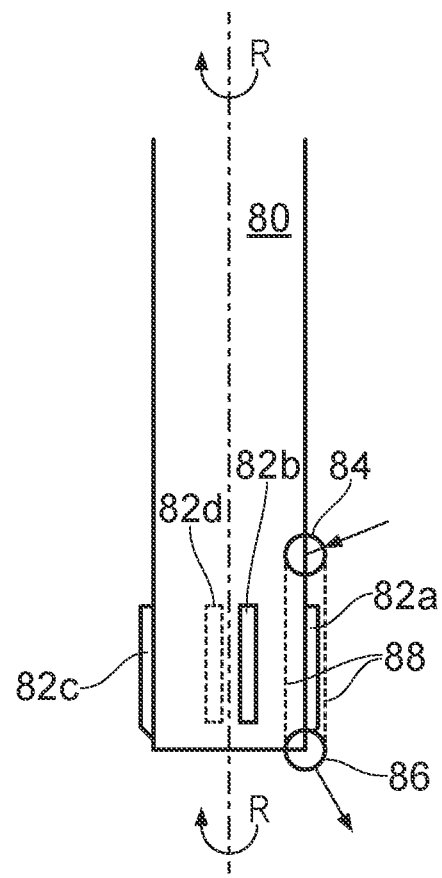
Figure 5:
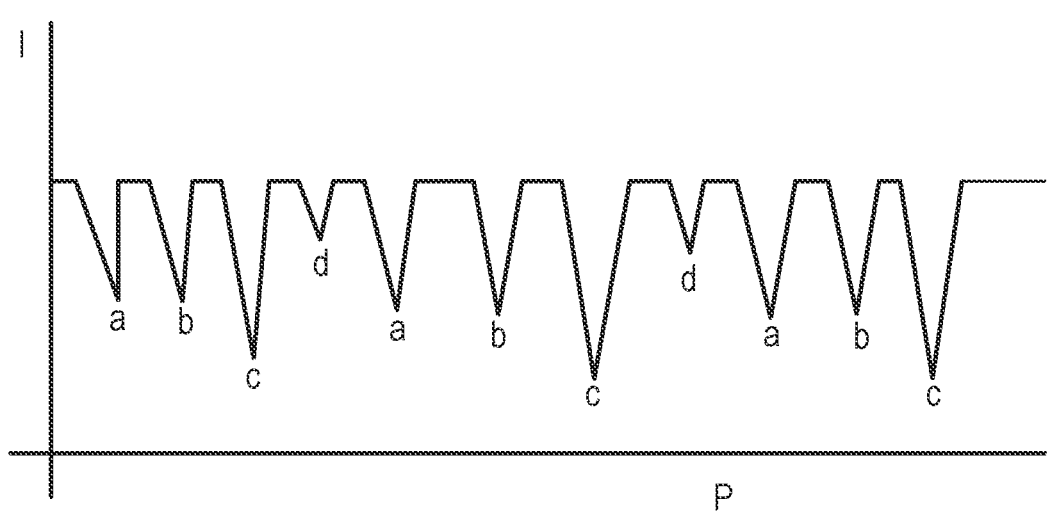
Figure 6:
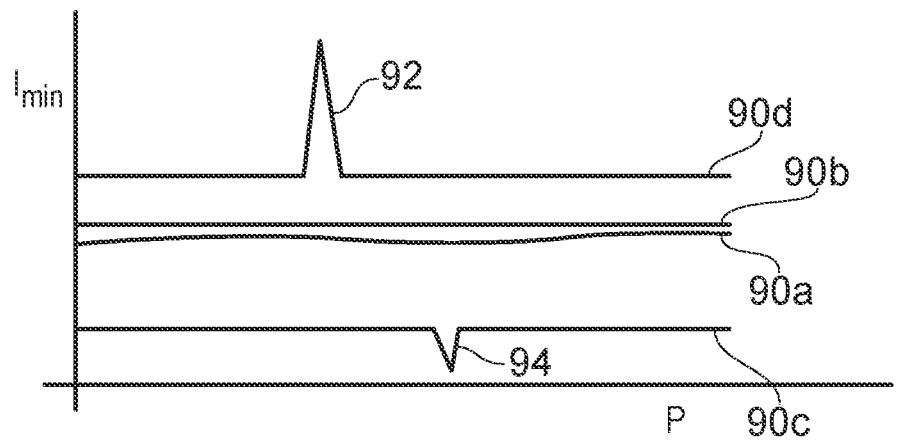
Figure 7:
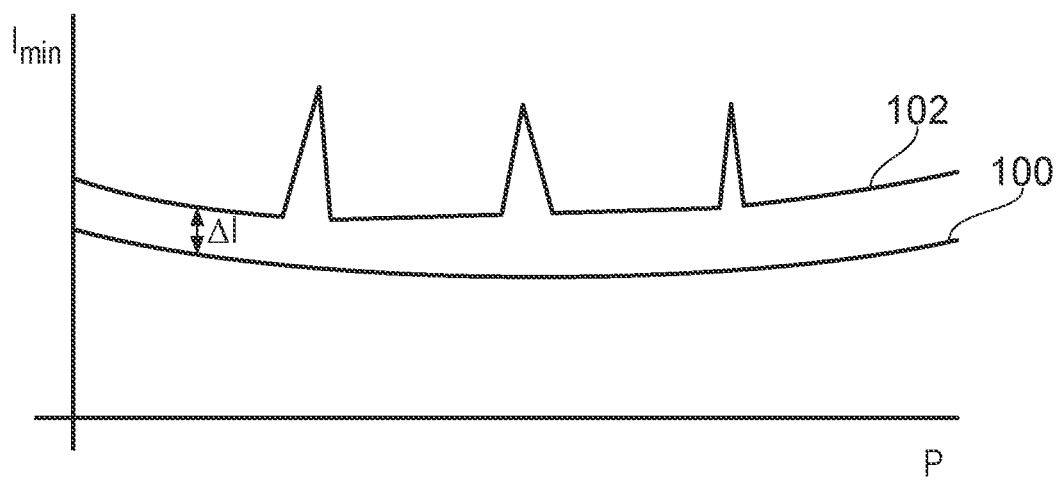
Figure 8:
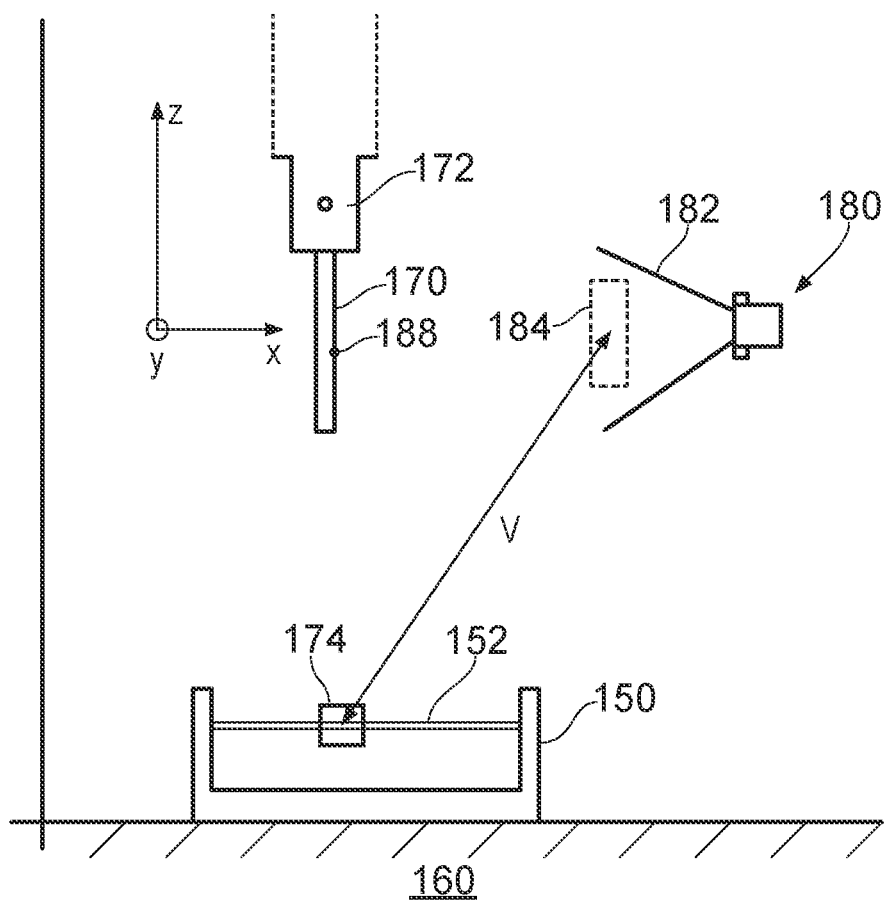
Figure 9A:
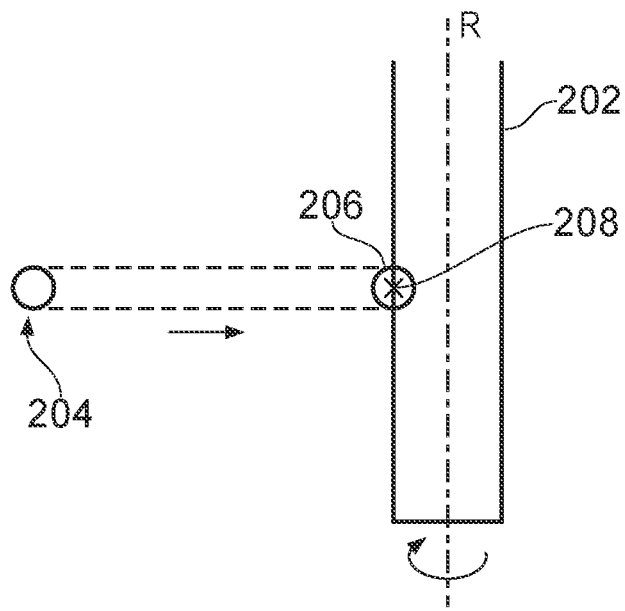
Figure 9B:
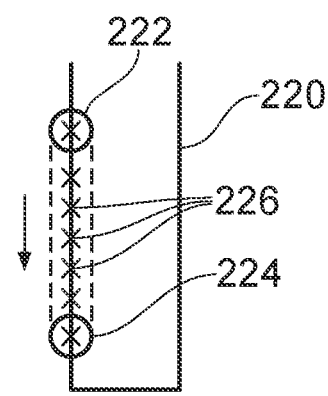
Figure 9C:
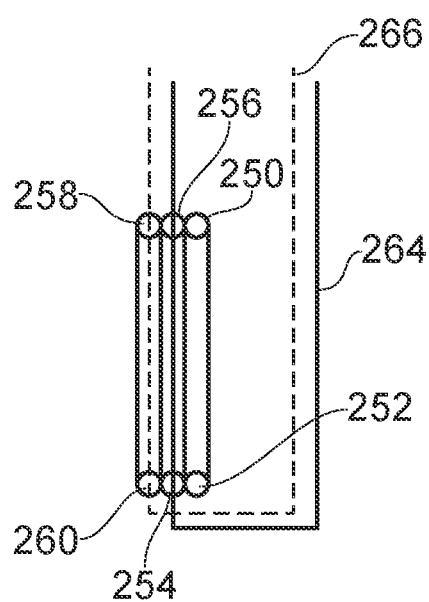

FIG. 3 shows the beam intensity data collected as the path shown in FIG. 2 is traversed, FIG. 4 shows a multi-tooth cutting tool that is rotated whilst a light beam is moved along an inspection path along its periphery, FIG. 5 shows the beam intensity data collected as the path shown in FIG. 4 is traversed, FIG. 6 shows the intensity minima associated with the different teeth of the tool shown in FIG. 5 plotted as a function of the position along the inspection path, FIG. 7 shows the intensity minima curve plotted against a previous measurement of the same tool, FIG. 8 shows how a camera could be used to photograph any identified tool defects, FIG. 9a illustrates a prior art tool inspection process, and FIGS. 9b and 9c illustrate tool periphery scanning of the present invention.

Figure 1:
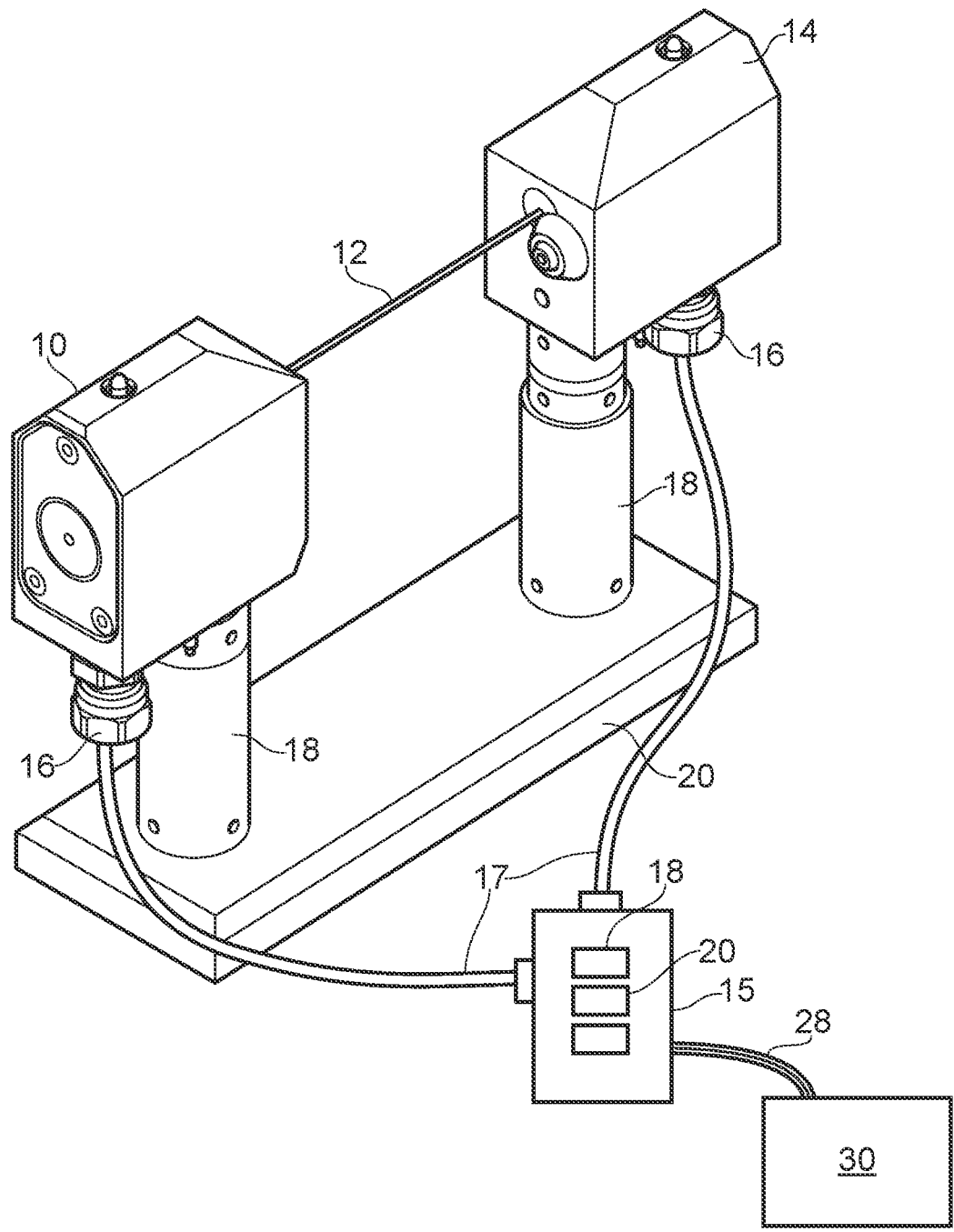
FIG. 1 shows a non-contact tool setting apparatus of the present invention.

Referring to FIG. 1, a tool setting apparatus of the present invention is illustrated. The apparatus comprises a transmitter 10 for generating a substantially collimated beam of light 12. The transmitter 10 includes a laser diode and suitable optics (not shown) for generating the collimated beam of light 12. A receiver 14 is also illustrated for receiving the beam of light 12. The receiver comprises a photodiode (not shown) for detecting the beam of light 12.

The transmitter 10 and receiver 14 are both affixed to a common base 20 by pillars 18. This arrangement ensures the transmitter 10 and receiver 14 maintain a fixed spacing and orientation relative to one another. The base 20 may then be mounted directly to the bed, or indeed any appropriate part, of a machine tool. It should also be noted that various alternative structures for mounting the transmitter and receiver could be used. For example, a common housing for the transmitter and receiver could be provided or discrete transmitter and receiver units could be separately mounted to the machine tool.

The apparatus also comprises an interface 15 connected to the transmitter 10 and receiver 14 via electrical cables 17. The interface 15 provides electrical power to the transmitter 10 and receiver 14 and also receives a beam intensity signal from the photodiode detector of the receiver 14. The interface 15 comprises an analogue to digital convertor (ADC) 18 that samples the analogue beam intensity signal generated by the receiver 14 and generates a stream of digital beam intensity values. This stream of digital beam intensity values, also termed beam intensity data, are passed to a digital signal processor (DSP) 20 for analysis. The results of the analysis may be passed to the machine tool 30 via link 28. In this example, the ADC 18 and DSP 20 are provided in the interface 15 but they could be included in any part of the system (e.g. in the receiver, machine tool controller etc). Thus far, the apparatus is analogous to that described in EP1587648.

Referring next to FIGS. 2 and 3, the tool profile assessment technique of the present invention will be described for a non-rotating tool. FIG. 2 illustrates a cutting tool 50 that comprises a cutting edge 52. The cutting tool has a nominal tool profile and is held by the moveable spindle of the machine tool (not shown). The location of the cutting tool and the location of the tool setting apparatus within the machine tool are known and the machine tool can be programmed to move the cutting tool 50 relative to the tool setting device.

In use, the machine tool is configured to move the tool so the light beam initially impinges on a first point 54 on the tool periphery. In this initial location, approximately fifty percent of the light beam is obscured. The tool is then moved so that the light beam traces the tool inspection path (as indicated by the pair of dashed lines 56) around the tool periphery until it reaches the second point 58. It can be seen that motion along the tool inspection path is substantially tangential to the tool periphery. During the movement of the beam along the tool inspection path 56, the beam intensity data generated by the ADC 18 of the tool setter device from the beam intensity signal is collected and stored.

Referring next to FIG. 3, the beam intensity data 60 is plotted as a function of the position P along the tool inspection path. If the machine tool moves the tool at a constant speed, then the relative position along the tool inspection path can simply be inferred from the time of acquisition of the beam intensity data. FIG. 3 also shows the nominal or predicted beam intensity data 62 that would be expected if a tool of nominal dimensions was moved along the same tool inspection path. The difference between the collected beam intensity data 60 and the predicted beam intensity data 62 provide a measure of how much the tool 50 deviates from its nominal size and shape.

Referring next to FIG. 4, a rotatable cutting tool 80 is illustrated that has four cutting teeth. It should be noted that the three teeth 82a, 82b and 82c are shown in solid outline whilst the fourth tooth 82d, which is located on the rear face of the tool shaft in the orientation illustrated in FIG. 4, is shown in dashed outline. The tool 80 is measured whilst it is being rotated about its longitudinal axis R by the machine tool spindle in which it is retained. The light beam is traced around the periphery of the tool along the tool inspection path. In particular, the tool inspection path extends around the periphery of the tool from the first point 84 to the second point 86. The spatial extent of the light beam as it traverses the path is illustrated by the dashed lines 88. During the movement of the beam along the tool inspection path, the beam intensity data generated by the ADC 18 of the tool setter device is collected and stored.

FIG. 5 illustrates some of the beam intensity data collected during inspection of the tool described with reference to FIG. 4. The beam intensity data is plotted as a function of the position P along the tool inspection path. Again, this position may be inferred from the time of data collection if the path is traversed at constant speed. The tool is rotating during the measurement and hence the beam intensity data includes minima that occur when each one of the four cutting teeth further occlude the beam. The series of minima are generated by each of the four teeth in turn as they rotate into the beam. The minima labelled a, b, c, and d in FIG. 5 thus correspond to the beam occlusion obtained when each of the four different cutting teeth 82a-d respectively occlude the beam. The minima may be identified by the DSP 20 using any of the techniques described in EP1587648. Furthermore, the DSP 20 can be configured to separate out the minimum values that are obtained from the different teeth of the cutting tool.

FIG. 6 shows the beam intensity at each identified minima, plotted as a function of position along the tool inspection path. In particular, curves 90a, 90b, 90c and 90d show the minima arising from the teeth 82a, 82b, 82c and 82d respectively. It should be noted that only a very small amount of the collected beam intensity data (i.e. data collected during three rotations of the tool) is shown in FIG. 5 and that the curves of FIG. 6 are generated from a large number of such minima. Curves 90a, 90b, 90c and 90d thus show the extent that each of the four different teeth 82a, 82b, 82c and 82d of the cutting tool occlude the light beam as the tool inspection path is traversed by the rotating tool.

The data plotted in FIG. 6 allows any chips or build-up of material on the teeth of the cutting tool to be identified. In particular, the peak 92 in curve 90d shows there is a chip in the tooth 82d of the tool; this peak 92 results from the intensity of the minima associated with tooth 82d increasing due to the chip allowing more light to pass to the receiver. Similarly, the trough 94 in curve 90c shows a build-up of excess material on the tooth 82c; this trough 94 results from the intensity of the minima associated with tooth 82c decreasing further due to the excess material blocking more light. Furthermore, the location of the defect (e.g. the chip or excess material) on each tooth can be determined from the position P of the peak and/or trough along the tool inspection path.

The minima shown in FIG. 6 will alone allow the presence and position of defects to be determined. As shown in FIG. 7, it is also possible to compare a plot of minima values measured for a certain tool to previously acquired minima data for that tool. In particular, the process of determining the intensity of certain identified minima as a function of position along the tool inspection path can be repeated multiple times. For example, such minima data may be collected from a tool prior to use of that tool for cutting purposes. A reference curve 100 can thus be obtained that provides information on the profile of the unused tool. After the tool has been used for a cutting operation, the measurement process can be repeated using the same tool inspection path. A minima value curve 102 can then be generated and compared to the reference curve 100. Any differences between the curve indicates wear of the cutting surface and any chips or build-up of material can also be identified from the differences between the curve 102 and the reference curve 100. A difference plot (i.e. curve 100 minus curve 102 or vice versa) may be used to provide a visual indication of any differences that are present.

Referring to FIG. 8, the addition of a camera for visually inspecting a tool is described. In particular, FIG. 8 shows a tool setting apparatus 150 of the type described above that emits a light beam 152 and is mounted to the bed 160 of a machine tool. The tool setting apparatus 150 is arranged to inspect a tool 170 held by a spindle 172 of the machine tool when that tool is located in the region 174 of the light beam 152. As described above, the tool setting apparatus 150 allows defects 188 in the tool 170 to be identified and in particular it permits the position of such defects on a tool to be determined. In addition to the tool setting apparatus 150, a front lit camera system 180 is also provided. The camera system emits a white light beam 182 and can take images of any objects located within its field of view 184. The location of the field of view 184 is known relative to the tool setting apparatus 150; i.e. they are separated by the positional difference V.

In use, the tool setting apparatus 150 is used to identify defects 188 on the tool 170. The positions of the tool setting apparatus 150, the camera's field of view 184 and the tool 170 are all known in the coordinate system of the machine tool. This means that the machine tool can move the spindle 172 so that the defect 188 on the tool 170 that has been identified by the tool setting apparatus 150 can be placed in the field of view 184 of the camera system 180. This allows an image of the tool defect to be captured, which in turn can allow an operator to assess the nature of the detected defect. Although the tool setting apparatus 150 is preferably of the type described above, it could comprise any tool setting apparatus.

For completeness, a detailed comparison of prior art tool setting techniques to the technique of the present invention will be given with reference to FIGS. 9a-9c Referring to FIG. 9a, a prior art tool measurement process is illustrated. As explained in the introduction above, the light beam of a prior art non-contact tool setter is moved towards a tool 202 from an initial position 204 spaced apart from the tool 202. In practise, the light beam is usually stationary and the tool is moved into the beam, but the same relative motion occurs as if the light beam was being moved. The light beam thus moves along a path that is substantially perpendicular to the edge of the tool 202 to be measured. In FIG. 9a, the light beam is initially at a start position 204. At the point 206 when the tool 202 obscures 50% of the light beam, a trigger signal is issued by the non-contact tool setter. The machine tool receives the trigger signal and records the position at which the trigger event occurred. This allows the position of a single point 208 on the surface of the tool 202 to be determined. This process may be repeated to measure multiple points on the tool edge.

FIG. 9b show a tool measurement process according to the present invention. As described above, the light beam is directed to a start position 222 on the edge of the tool. In this example, a tool of nominal dimensions will obscure approximately fifty percent of the light beam. The light beam is then traced along the peripheral edge of the tool from the start position 222 to an end position 224 (the path followed by the light beam is the so-called tool inspection path). At multiple points 226 along the tool inspection path, beam intensity data are collected. The tool inspection path may be traced in a continuous motion (e.g. at constant speed) or the speed may be varied as the path is traversed. It is also possible to dwell at each of the points 226 (i.e. momentarily halt the motion of the light beam relative to the tool) and to optionally perform an averaging procedure at each point (e.g. to improve the signal-to-noise ratio of the beam intensity data and/or to obtain a more accurate measurement of the position of the tool relative to the non-contact tool setter).

For a perfect tool (i.e. a tool that corresponds exactly to the nominal tool profile) there will be (in this example) fifty percent of the light beam obscured at each point along the tool inspection path. For an actual tool (which may have become worn or experienced material build-up during a machining operation) any local deviations in the tool edge position will result in the amount of the light beam that is obscured being different to the fifty percent level expected for a nominal tool. In other words, deviations in the beam intensity data from the expected fifty percent at each of the points 226 indicates the tool is larger (obscuring more of the light beam) or smaller (obscuring less of the light beam) than expected. The beam intensity data are combined with information from the machine tool describing the position of the light beam 220 at each point 226 to provide multiple measurements of the surface position of the tool. In this manner, multiple points 226 can be measured in a rapid scanning-type action without a need to move the tool back-and-forth into the beam as per the prior art technique illustrated in FIG. 9a.

Referring to FIG. 9c, it is noted that the tool inspection path may comprise multiple traverses along the peripheral edge of the tool. This may be done, for example, if the uncertainly in the nominal location of the tool edge is significantly greater than the width of the light beam.

FIG. 9c shows a tool inspection path in which a light beam is moved linearly downwards from an initial position 250 to a first position 252. The light beam is then stepped sideways to a second position 254 before being moved linearly upwards to the third position 256. It is then stepped sideways to a fourth position 258 before being moved linearly downwards to an end position 260. Although the linear move between the second position 254 and third position 256 alone is sufficient to measure the edge of a tool 264 in a nominal location, it would not be able to measure a tool shifted from that nominal location by more than the beam width (e.g. to the tool position indicated by the dashed outline tool 266). Providing multiple passes will, however, enable any such larger deviations in position (or tool size) to be measured. For example, beam intensity data collected when the light beam moves from the fourth position 258 to the end position 260 would be able to measure the edge of the dashed outline tool 266. It would, of course, also be possible to use beam intensity data from different traverses of the light beam if, for example, the tool was angled so different areas of the tool edge were present in different traverses of the light beam. As an alternative to such a multi-pass technique, the width of the light beam could be increased.

The skilled person would appreciate that variations to the above embodiments are possible. For example, the method could be implemented using non-contact tool setting apparatus mounted on any co-ordinate positioning apparatus (e.g. a CMM, robot, off-line tool inspection system etc) and not just a machine tool.

The invention claimed is:

1. A method for assessing a profile of a non-rotating tool using a break-beam tool setting apparatus comprising (i) a transmitter for emitting a light beam having a circular profile and (ii) a receiver for receiving the light beam, the receiver generating a single beam intensity signal describing intensity of received light, the break-beam tool setting apparatus being mounted to a coordinate positioning apparatus that allows the non-rotating tool to be translated along three mutually orthogonal linear axes relative to the break-beam tool setting apparatus, and the method comprising steps of:
(i) using the coordinate positioning apparatus to translate the non-rotating tool relative to the break-beam tool setting apparatus along one or more of the three mutually orthogonal linear axes so that the light beam is moved along an edge of the non-rotating tool;
(ii) collecting beam intensity data describing the single beam intensity signal that is generated by the receiver while the light beam is moved along the edge of the non-rotating tool during step (i); and
(iii) analysing the beam intensity data collected in step (ii) to determine a profile of the edge of the tool,
wherein a tool inspection path is pre-calculated prior to step (i) using data describing a nominal or expected profile of the tool, and step (i) comprises the coordinate positioning apparatus using the pre-calculated tool inspection path to impart the translation of the non-rotating tool relative to the break-beam tool setting apparatus that causes the light beam to be moved along the edge of the non-rotating tool.

2. The method according to claim 1, wherein step (iii) comprises comparing the beam intensity data collected in step (ii) with previously acquired beam intensity data.

3. The method according to claim 2, wherein
the previously acquired beam intensity data comprises data collected from a previous measurement of the same tool or from a reference tool having the same nominal profile as the tool, and
the analysis of step (iii) provides an indication of whether the tool profile has changed relative to the previous measurement.

4. The method according to claim 1, wherein the coordinate positioning apparatus is a machine tool.

5. The method according to claim 1, wherein
step (ii) comprises digitising the single beam intensity signal to generate the beam intensity data, and
step (iii) comprises using a digital signal processor to analyse the beam intensity data.

6. The method according to claim 1, wherein the receiver has a single photodiode.

7. A method for assessing a profile of a non-rotating tool using a break-beam tool setting apparatus comprising (i) a transmitter for emitting a light beam having a circular profile and (ii) a receiver for receiving the light beam, the receiver generating a single beam intensity signal describing intensity of received light, the break-beam tool setting apparatus being mounted to a coordinate positioning apparatus that allows the non-rotating tool to be translated along three mutually orthogonal linear axes relative to the break-beam tool setting apparatus, and the method comprising steps of:
(i) using the coordinate positioning apparatus to translate the non-rotating tool relative to the break-beam tool setting apparatus along one or more of the three mutually orthogonal linear axes so that the light beam is moved along an edge of the non-rotating tool;
(ii) collecting beam intensity data describing the single beam intensity signal that is generated by the receiver while the light beam is moved along the edge of the non-rotating tool during step (i); and
(iii) analysing the beam intensity data collected in step (ii) to determine a profile of the edge of the tool,
wherein a tool inspection path is pre-calculated prior to step (i) using data describing a nominal or expected profile of the tool, and step (i) comprises the coordinate positioning apparatus using the pre-calculated tool inspection path to impart the translation of the non-rotating tool relative to the break-beam tool setting apparatus that causes the light beam to be moved along the edge of the non-rotating tool, and
wherein the tool inspection path comprising a start position on the non-rotating tool and an end position on the non-rotating tool, the start position and the end position being located at different positions along a longitudinal axis of the non-rotating tool, and the translation of the non-rotating tool relative to the break-beam tool setting apparatus of step (i) causing the light beam to be scanned along the non-rotating tool from the start position to the end position without the non-rotating tool moving out of the light beam.

* * * * *